Jan. 13, 1931.  A. T. EGOLF  1,789,225
INTERNAL COMBUSTION ENGINE
Filed March 28, 1929  3 Sheets-Sheet 1

Inventor
Arthur T. Egolf.

By Clarence A. O'Brien
Attorney

Jan. 13, 1931. A. T. EGOLF 1,789,225
INTERNAL COMBUSTION ENGINE
Filed March 28, 1929 3 Sheets-Sheet 2

Inventor
Arthur T. Egolf

By Clarence A. O'Brien
Attorney

Jan. 13, 1931. A. T. EGOLF 1,789,225
INTERNAL COMBUSTION ENGINE
Filed March 28, 1929  3 Sheets-Sheet 3

Inventor
Arthur T. Egolf

By Clarence A. O'Brien
Attorney

Patented Jan. 13, 1931

1,789,225

UNITED STATES PATENT OFFICE

ARTHUR T. EGOLF, OF LA PORTE, INDIANA

INTERNAL-COMBUSTION ENGINE

Application filed March 28, 1929. Serial No. 350,610.

The present invention relates to internal combustion engines, and more particularly to a piston valve mechanism for controlling the feeding of the fuel into the combustion chamber of the engine.

One of the important objects of the invention is to provide an intake cylinder in operative association with each of the combustion cylinders, and arranging pistons within each of said cylinders, and operatively connecting the same with the crank shaft of the engine for controlling the feeding of the fuel into the combustion cylinder.

A further important object of the invention is to provide a fuel cylinder within which the fuel may be compressed before the same enters the compression cylinder, after which the fuel is again compressed before igniting the same.

Another object is to provide an engine of this character of a simple and practical construction which is efficient and reliable in its performance, economical in operation, which eliminates the use of the conventional valve construction for internal combustion engines and which is otherwise well designed for the purposes for which it is intended.

Other objects of the invention will become apparent during the course of the following detailed description taken in connection with the accompanying drawings.

Figure 1:
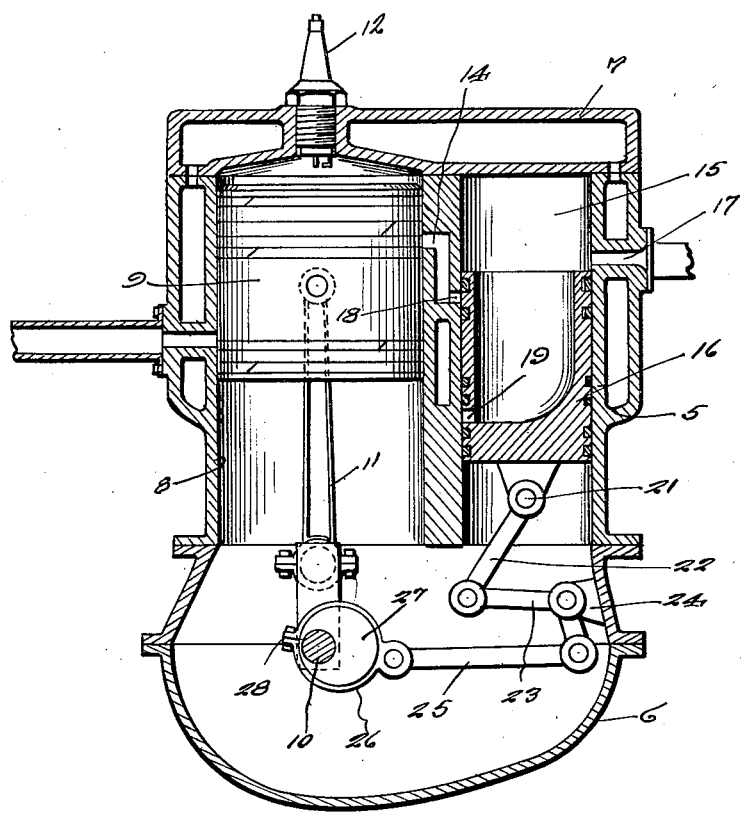
Figure 1 is a vertical sectional view through an engine constructed in accordance with my invention and illustrating the air pistons of the cylinders at the top of the power stroke.
Figure 3:
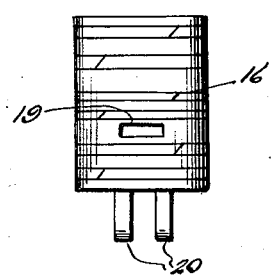
Figure 3 is a side elevational view of the system for the fuel feed cylinder.

Referring now to the drawings in detail, wherein for the purpose of illustration I have disclosed a preferred embodiment of the invention, the numeral 5 designates generally the engine block of an internal combustion engine having a front face 6 secured to its lower edge and provided with a head 7 at the upper portion thereof. The engine block is provided with the usual compression cylinder 8 having a piston 9 operatively mounted therein and connected with the crank shaft 10 by a connecting rod 11. A spark plug 12 is provided in the engine head 7 providing means for igniting the charge of fuel after the same has been compressed within the cylinder 8.

Figure 2:
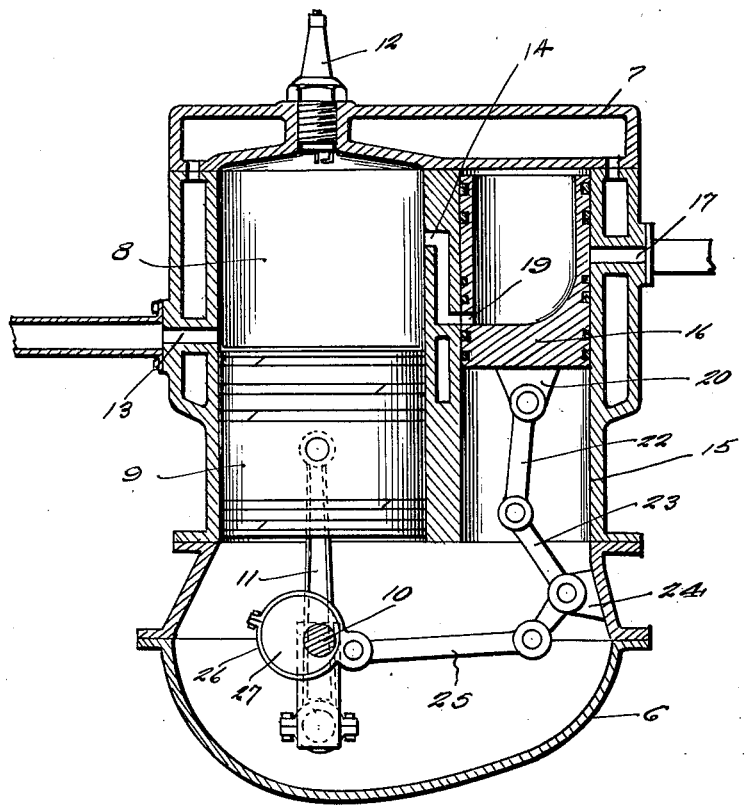
Figure 2 is a similar view showing the pistons in an opposite position.
Figure 4:
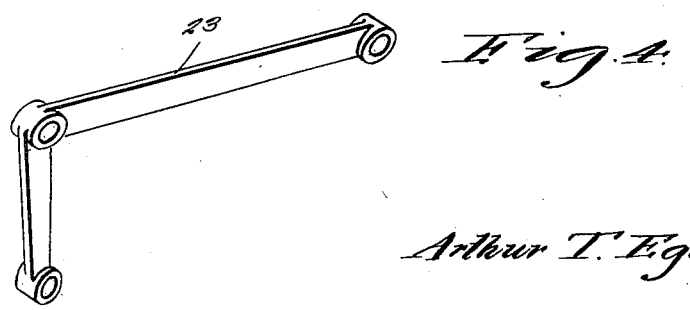
Figure 4 is a perspective view of the bell crank provided for connecting the links of the auxiliary or fuel feed systems with the link attached to the crank shaft of the engine.
Figure 5:
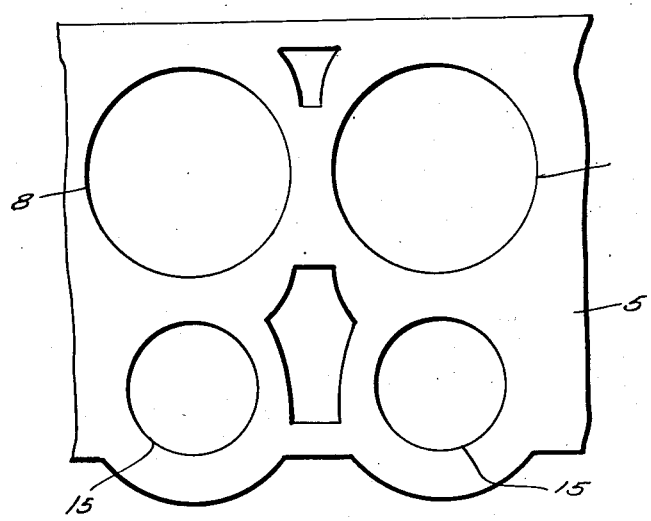
Figure 5 is a fragmentary top plan view of the engine block with the head removed.
Figure 6:
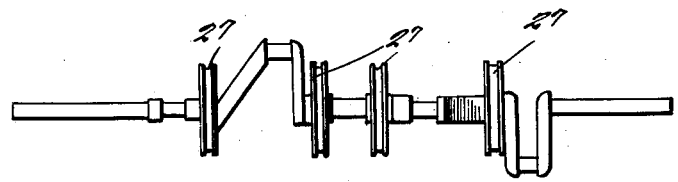
Figure 6 is an elevational view of one form of crank shaft.
Figure 7:
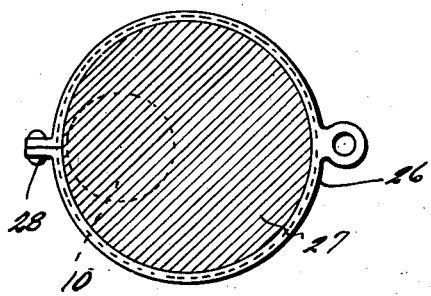
Figure 7 is a sectional view through the crank shaft illustrating one of the eccentrics provided for operating the piston of the fuel feed cylinder.

At one end of the cylinder 8 against the lower portion thereof is arranged an exhaust port 13, the port being disposed in open position to permit the establishing of the cylinder when the piston is at its lowermost position as illustrated in Figure 2 of the drawing. At the opposite side of the cylinder wall is arranged a fuel intake port 14 and is positioned in the cylinder wall adjacent the upper portion thereof. With each of the explosion cylinders 8 of the engine is associated a fuel compression cylinder 15, within which a piston 16 is operatively mounted. A fuel feed port 17 communicates with the compression cylinder 15 to the wall of the cylinder at one side thereof, and at the opposite side of said compression cylinder is a port 18 communicating with the fuel intake port 17 of the explosion cylinder.

The piston 16 is hollow at its upper portion and opens upwardly into the cylinder 15, the side wall of the piston adjacent the port 18 having an opening 19 formed therein communicating with the interior of the cylinder and registerable with the port 18 when the piston has been moved into its uppermost position as clearly illustrated in Figure 2 of the drawings.

The under side of the piston 16 is closed and is provided with a pair of spaced parallel projections 20 between which a wrist pin 21 is supported for pivotally attaching one end of the link 22. To the lower end of the link 22 is attached one end of a bell crank lever 23 which is pivoted intermediate its ends upon a bracket 24 mounted within the crank case 6. At the opposite end of the bell crank lever 23 is pivotally attached a link 25 which extends in a direction toward the crank shaft and is pivotally attached to one side of a collar 26, mounted upon an eccentric 27 formed on the crank shaft 10. The collar 26 is split at one side, as shown at 28, to facilitate the placing of the collar in position upon the eccentric.

With the operation of the device, it will be apparent that upon the suction stroke of the piston 16 the fuel will be drawn into the compression cylinder 15 and upon the opposite movement of the piston, the fuel will be compressed in said cylinder until the piston reaches its uppermost position whereupon the ports leading to the explosion cylinder 8 will then become registered with the opening 19 of the piston to permit the compressed fuel from the cylinder 15 to enter the explosion cylinder 8. At the time at which the fuel is fed into the cylinder 8, the piston 9 of the explosion cylinder will be at its lowermost position and accordingly upon the upward movement of said piston, the fuel will again become compressed and placed in a proper condition for igniting by means of the spark plug 12. The igniting of the fuel results in the power stroke of the piston 9 and upon the completion of the power stroke the exhaust port 13 is uncovered and the exhaust gases are then permitted to escape from the engine.

By reason of the connection of both pistons with the crank shaft of the engine, the use of the conventional type of valve for controlling the intake and discharge portions of the engine is eliminated.

It is obvious that the invention is susceptible of various changes and modifications without departing from the spirit or scope of the invention or sacrificing any of its advantages, and I accordingly claim all such forms of the device to which I am entitled.

I claim:

An internal combustion engine comprising an explosion cylinder and a fuel compression cylinder, ports providing communication therebetween, a discharge port for the explosion cylinder, and an intake port for the compression cylinder, pistons operable in each of the cylinders, a crank shaft, a connecting rod operatively connecting the crank shaft with the piston in the explosion cylinder, an eccentric carried by the crank shaft, a pair of links connected at one end respectively with the eccentric and the other of said pistons, a bracket on the wall of the crank case and positioned immediately beneath the compression cylinder, a bell crank lever pivotally mounted on said bracket and having its ends operatively connected with the one and the other respectively of the said pair of links, whereby to cooperatively connect the eccentric and the compression piston.

In testimony whereof I affix my signature.

ARTHUR T. EGOLF.